US007738719B2

(12) United States Patent
Weitbruch et al.

(10) Patent No.: US 7,738,719 B2
(45) Date of Patent: Jun. 15, 2010

(54) METHOD AND DEVICE FOR PROCESSING VIDEO DATA BY COMBINING ERROR DIFFUSION AND ANOTHER DITHERING

(75) Inventors: Sébastien Weitbruch, Niedereschach (DE); Cédric Thebault, Villingen-Schwenningen (DE); Carlos Correa, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 837 days.

(21) Appl. No.: 11/186,471

(22) Filed: Jul. 21, 2005

(65) Prior Publication Data

US 2006/0017746 A1 Jan. 26, 2006

(30) Foreign Application Priority Data

Jul. 23, 2004 (EP) ................................ 04291878
Oct. 1, 2004 (EP) ................................ 04023434

(51) Int. Cl.
*G06K 9/00* (2006.01)
*G06K 15/00* (2006.01)

(52) U.S. Cl. ...................... 382/252; 358/3.03; 358/3.13

(58) Field of Classification Search ................ 382/252; 358/3.03, 3.13
See application file for complete search history.

(56) References Cited

U.S. PATENT DOCUMENTS 5,973,794 A * 10/1999 Kim .......................... 358/3.03
6,069,609 A 5/2000 Ishida et al.
6,756,995 B2 * 6/2004 Thebault et al. ............ 345/690
6,851,783 B1 * 2/2005 Gupta et al. ................. 347/15
7,076,110 B2 * 7/2006 Kempf ...................... 382/252
7,184,053 B2 * 2/2007 Correa et al. .............. 345/589
7,256,794 B2 * 8/2007 Myoung et al. ............ 345/596
7,339,706 B2 * 3/2008 Ohta ......................... 358/3.03
2003/0090729 A1 * 5/2003 Loce et al. ................. 358/3.06
2003/0103059 A1 * 6/2003 Correa et al. .............. 345/596
2004/0021882 A1 * 2/2004 Kakutani .................... 358/1.9
2004/0125117 A1 * 7/2004 Suzuki et al. .............. 345/690

FOREIGN PATENT DOCUMENTS

EP 1 262 947 A 12/2002

OTHER PUBLICATIONS

Weithbruch S., et al., "New Metacode Coding Concept For Improving PDP Gray-Scale Quality" Journal Of The Society For Information Display, Sah Jose, US vol. 11, No. 3 2003 pp. 485-491, XP002280890 issn: 1071-0922 *abstract* *paragraphs '0003!, '004!*.
EPO Search Report.

* cited by examiner

*Primary Examiner*—Wenpeng Chen
*Assistant Examiner*—Soo Jin Park
(74) *Attorney, Agent, or Firm*—Robert D. Shedd; Joseph J. Opalach

(57) ABSTRACT

For improving the grey scale portrayal, several dithering methods are used: Cell-based dithering, multi-mask dithering or error diffusion. Each of them has specific disadvantages. A simple combination of them does not bring expected advantages. However, an improvement is obtained if the result of the multi-mask dithering is used for controlling the error diffusion by a switch, for example.

7 Claims, 5 Drawing Sheets

METHOD AND DEVICE FOR PROCESSING VIDEO DATA BY COMBINING ERROR DIFFUSION AND ANOTHER DITHERING

This application claims the benefit, under 35 U.S.C.§119 of European Patent Applications 04291878.9 filed Jul. 23, 2004 and 04023434.6 filed Oct. 1, 2004.

FIELD OF THE INVENTION

The present invention relates to a method for processing video data for display on a display device having a plurality of luminous elements corresponding to the pixels of a picture, wherein the time of a video frame or field is divided into a plurality of sub-fields during which the luminous elements can be activated for light emission in small pulses corresponding to a sub-field code word of n bits used for encoding the p possible video levels lighting a pixel, comprising the steps of: performing cell-based, pixel-based or multi-mask dithering for reducing a quantization error, said dithering outputting a dither value “1” or “0” for each pixel or cell, a cell being a luminous element of a pixel, and performing an error diffusion for each pixel or cell for reducing the quantization error. Furthermore, the present invention relates to a corresponding device for processing video data.

BACKGROUND OF THE INVENTION

A PDP utilizes a matrix array of discharge cells, which can only be “ON”, or “OFF”. Also unlike a CRT or LCD in which grey levels are expressed by analogue control of the light emission, a PDP controls the grey level by modulating the number of light pulses per frame (sustain pulses). This time-modulation will be integrated by the eye over a period corresponding to the eye time response. Since the amplitude video is portrayed by the number of light pulses, occurring at a given frequency, more amplitude means more light pulses and thus more “ON” time. For this reason, this kind of modulation is also known as PWM, pulse width modulation.

This PWM is responsible for one of the PDP image quality problems: the poor grey scale portrayal quality, especially in the darker regions of the picture. This is due to the fact, that displayed luminance is linear to the number of pulses, but the eye response and sensitivity to noise is not linear. In darker areas the eye is more sensitive than in brighter areas. This means that even though modern PDPs can display ca. 256 discrete grey levels, quantization error will be quite noticeable in the darker areas.

To achieve a better grey scale portrayal, within the internal data processing a dithering signal is added to a processed video signal, before truncation to the final video grey scale amplitude resolution. Dithering is a well-known technique from the technical literature, used to reduce the effects of quantization noise due to a reduced number of displayed resolution bits. Dithering, by adding artificial levels in-between, improves grey scale portrayal, but adds high frequency low amplitude dithering noise, perceptible to the human viewer only at a small viewing distance. There are mainly two kinds of dithering used for PDP:

Cell-Based dithering (EP1269457)and its enhanced version: Multi-Mask dithering (EP1262947), which improves grey scale portrayal but adds high frequency low amplitude dithering pattern (e.g. checker pattern). The content of both documents is incorporated herein by reference. This concept of dithering is based on the spatial and temporal eye integration function. In other words, it is possible to display levels located between the value 1 and 2 by simply mixing these values spatially and temporally. However, it is not possible to render more than 3 additional bits with this method without introducing disturbing low frequency flickering. The major advantage of this concept is that the unnatural dithering pattern introduced by this method is quite invisible at a normal viewing distance. Moreover, this method is independent of the picture content.

Error-Diffusion: it improves grey scale portrayal and generates no dithering pattern. This method is based on a distribution of fractional parts to the neighbouring cells. But it adds a noise mainly in the darker areas (which becomes more noticeable for static pictures without temporal noise). In theory it is possible to render more bits with this method but after a certain limit the gain is no more visible but the noise increases. Finally, it can be said that this method has the disadvantage of adding noise visibly even at a normal viewing distance but it is more natural for moving pictures. Furthermore, this method is dependent on the picture content.

In the following, the necessity of dithering is pointed out in detail. As mentioned before, plasma uses PWM (pulse width modulation) to generate the different shades of grey. Contrarily to CRTs where luminance is approximately quadratic to applied cathode voltage, luminance is linear to the number of discharge pulses. Therefore an approximately digital quadratic degamma function has to be applied to video before the PWM.

Due to this degamma function, for smaller video levels, many input levels are mapped to the same output level. In other words, for darker areas, the output number of quantization bits is smaller than the input number, in particular values smaller than 16 (when working with 8 bit for video input) are all mapped to value 0 (this corresponds to four bit resolution which is actually unacceptable for video). Indeed, the output value corresponding to an input video level of 11, is:

$$\text{Out} = 255 \times \left(\frac{11}{255}\right)^{2.2} = 0.25$$

in the case of a gamma value of 2.2 (standard video). However, a 8-bit display like a PDP will not be able to render the fractional part. Therefore, if nothing special is done, the low input levels are all mapped to 0 and so on.

However, as already said, dithering is a known technique for avoiding losing amplitude resolution bits to truncation. It only works if the resolution is available before truncation, which is the present case (if more bits are used for degamma). Dithering can in principle bring back as many bits as those lost by truncation. However dithering noise frequency decreases, and therefore becomes more noticeable, with the number of dithering bits.

1 bit of dithering corresponds to multiply the number of available output levels by 2, 2 bits of dithering multiply by 4, and 3 bits of dithering multiply by 8 the number of output levels.

The required amount of fractional bits mandatory to render the first input video level (1) is 10 bits since $$255 \times \left(\frac{1}{255}\right)^{2.2} = 0.00129 \text{ and } 0.00129 \times 2^{10} \geq 1.$$

Cell-based dithering adds a dithering pattern that is defined for every cell of the panel and not for every pixel (3 cells) of this panel. A panel pixel is composed of three cells: red, green and blue. This has the advantage of rendering the dithering noise finer and thus less noticeable to the human viewer. The difference can directly be seen in FIG. 1.

The multi-mask dithering represents an improved version of the cell-based dithering by using different kinds of dithering functions depending of the fractional part to be rendered. For instance, for 3 bit dithering able to render 8 different fractional parts of the value x, 8 different masks will be used (cf. EP 1 262 947) as described below:

Input between x.000 and x.125→mask 0 (mask full of 0)
Input between x.125 and x.250→mask 1
Input between x.250 and x.375→mask 2
Input between x.375 and x.500→mask 3
Input between x.500 and x.625→mask 4
Input between x.625 and x.750→mask 5
Input between x.750 and x.875→mask 6
Input between x.875 and 1→mask 7

Some examples of masks are given in the following table, wherein each frame or mask covers 4×4=16 cells. Mask 1 is the mask defined for the level 1/8, mask 2 is the mask defined for the level 1/4, mask 3 is the mask defined for the level 3/8, mask 4 is the mask defined for the level 1/2, mask 5 is the mask defined for the level 5/8, mask 6 is the mask defined for the level 3/4, mask 7 is the mask defined for the level 7/8.

In contrast to dithering, error diffusion is a neighbourhood operation that quantizes the current pixel signal for example by keeping the integer part of the signal value) and then transfers the quantization error (fractional part) onto future pixels. Formally, Floyd and Steinberg (*"An adaptive algorithm for spatial greyscale" in Proc. Soc. Information Display,* 1976, vol 17, no. 2, pp. 75-78) define the output pixel y[n] by adjusting and rounding the pixel signal, i.e. the input pixel x[n] such that:

$y[n]=\mathrm{int}(x[n]+x_e[n])$ where $x_e[n]$ is the diffused error (fractional part) accumulated during previous iterations as $$x_e[n] = \sum_{i=1}^{M} b_i \cdot y_e[n-i]$$

where $y_e[n]$ represents the various fractional parts such as $y_e[n]=(x[n]+x_e[n])-y[n]$ Although error-diffusion images are very pleasant to the eye (introduced noise being similar to natural video noise), the algorithm does generate some unwanted textures (depending on picture content) that can be very objectionable and that never happens with a matrix solution like the multi-mask dithering.

| | | Frame 1 | | | | Frame 2 | | | | Frame 3 | | | | Frame 4 | | | |
|---|---|---|---|---|---|---|---|---|---|---|---|---|---|---|---|---|---|
| Level 1/8 | line 1 | 1 | 0 | 0 | 0 | 0 | 0 | 0 | 0 | 0 | 0 | 0 | 0 | 0 | 0 | 0 | 0 |
| | line 2 | 0 | 0 | 0 | 0 | 0 | 0 | 1 | 0 | 0 | 1 | 0 | 0 | 0 | 0 | 0 | 1 |
| | line 3 | 0 | 0 | 1 | 0 | 1 | 0 | 0 | 0 | 0 | 0 | 0 | 0 | 0 | 0 | 0 | 0 |
| | line 4 | 0 | 0 | 0 | 0 | 0 | 0 | 0 | 0 | 0 | 0 | 0 | 1 | 0 | 1 | 0 | 0 |
| Level 1/4 | line 1 | 1 | 0 | 0 | 0 | 0 | 0 | 1 | 0 | 0 | 0 | 0 | 1 | 0 | 1 | 0 | 0 |
| | line 2 | 0 | 1 | 0 | 0 | 0 | 0 | 0 | 1 | 1 | 0 | 1 | 0 | 1 | 0 | 0 | 0 |
| | line 3 | 0 | 0 | 1 | 0 | 1 | 0 | 0 | 0 | 0 | 1 | 0 | 0 | 0 | 0 | 0 | 1 |
| | line 4 | 0 | 0 | 0 | 1 | 0 | 1 | 0 | 0 | 1 | 0 | 0 | 0 | 0 | 0 | 1 | 0 |
| Level 3/8 | line 1 | 1 | 0 | 0 | 0 | 0 | 0 | 1 | 0 | 1 | 0 | 0 | 1 | 0 | 1 | 1 | 0 |
| | line 2 | 0 | 1 | 1 | 0 | 1 | 0 | 0 | 1 | 0 | 1 | 0 | 0 | 0 | 0 | 0 | 1 |
| | line 3 | 0 | 0 | 1 | 0 | 1 | 0 | 0 | 0 | 0 | 1 | 1 | 0 | 1 | 0 | 0 | 1 |
| | line 4 | 1 | 0 | 0 | 1 | 0 | 1 | 1 | 0 | 0 | 0 | 0 | 1 | 0 | 1 | 0 | 0 |
| Level 1/2 | line 1 | 1 | 0 | 1 | 0 | 0 | 1 | 0 | 1 | 1 | 0 | 1 | 0 | 0 | 1 | 0 | 1 |
| | line 2 | 0 | 1 | 0 | 1 | 1 | 0 | 1 | 0 | 0 | 1 | 0 | 1 | 1 | 0 | 1 | 0 |
| | line 3 | 1 | 0 | 1 | 0 | 0 | 1 | 0 | 1 | 1 | 0 | 1 | 0 | 0 | 1 | 0 | 1 |
| | line 4 | 0 | 1 | 0 | 1 | 1 | 0 | 1 | 0 | 0 | 1 | 0 | 1 | 1 | 0 | 1 | 0 |
| Level 5/8 | line 1 | 1 | 1 | 0 | 1 | 0 | 1 | 1 | 1 | 1 | 0 | 0 | 1 | 0 | 1 | 1 | 0 |
| | line 2 | 0 | 1 | 1 | 0 | 1 | 0 | 0 | 1 | 1 | 1 | 1 | 0 | 1 | 0 | 1 | 1 |
| | line 3 | 0 | 1 | 1 | 1 | 1 | 1 | 0 | 1 | 0 | 1 | 1 | 0 | 1 | 0 | 0 | 1 |
| | line 4 | 1 | 0 | 0 | 1 | 0 | 1 | 1 | 0 | 1 | 0 | 1 | 1 | 1 | 1 | 1 | 0 |
| Level 3/4 | line 1 | 1 | 0 | 1 | 1 | 0 | 1 | 1 | 1 | 1 | 1 | 0 | 1 | 1 | 1 | 1 | 0 |
| | line 2 | 0 | 1 | 1 | 1 | 1 | 0 | 1 | 1 | 1 | 1 | 1 | 0 | 1 | 1 | 0 | 1 |
| | line 3 | 1 | 1 | 1 | 0 | 1 | 1 | 0 | 1 | 0 | 1 | 1 | 1 | 1 | 0 | 1 | 1 |
| | line 4 | 1 | 1 | 0 | 1 | 1 | 1 | 1 | 0 | 1 | 0 | 1 | 1 | 0 | 1 | 1 | 1 |
| Level 7/8 | line 1 | 1 | 0 | 1 | 1 | 1 | 1 | 1 | 1 | 1 | 1 | 1 | 0 | 1 | 1 | 1 | 1 |
| | line 2 | 1 | 1 | 1 | 1 | 0 | 1 | 1 | 1 | 1 | 1 | 1 | 1 | 1 | 1 | 0 | 1 |
| | line 3 | 1 | 1 | 1 | 0 | 1 | 1 | 1 | 1 | 1 | 0 | 1 | 1 | 1 | 1 | 1 | 1 |
| | line 4 | 1 | 1 | 1 | 1 | 1 | 1 | 0 | 1 | 1 | 1 | 1 | 1 | 0 | 1 | 1 | 1 |

These patterns have been chosen in order to reduce the size of the noisy static patterns, line flicker, and also the noise introduced by asymmetries between the different dithering patterns. The main advantage of the solution is that the masks are fix and do not depend on the video content of the picture. However, only 3 bits can be rendered, which corresponds to the minimum input value of 8 (all values between 0 and 8 are lost, as can be gathered from the above equation of the degamma function).

The error diffusion process itself consists of three steps. First, a modified input is formed as the sum of the original input value and the diffused past errors (located above and left of the current pixel). In the second step, this modified error is rounded to yield the output. As the last step, the quantization error (rest of fractional part) is calculated as the difference between the modified input and the final output. Then, this quantization error will be spread to the neighbouring pixels by weighting it with a coefficient that can be chosen in various ways.

FIG. 2 illustrates this principle. At the first stage of the example, the value of the current pixel is 4.5. Then, this value is rounded to 4 generating an error of 0.5. This error will be diffused on three neighboring pixels using three different coefficients (0.5 for the right pixel, 0.3 for the bottom right and 0.2 for the bottom one). Normally, the coefficients are chosen in order to keep the energy constant (sum of coefficient is 1). This is mandatory to keep a good stability in the picture. After these steps, the values of three pixels have changed:

$$4.85+0.5\times0.5=5.1$$

$$4.55+0.5\times0.3=4.7$$

$$5.10+0.5\times0.2=5.2$$

Then, the process will continue with the current pixel having the value 5.1.

The main disadvantage of the concept is its dependency from the picture content. Indeed the spread error depends on the value of the current pixel and its effect is only visible on its neighbors and is thus picture dependent. Moreover, the rendition of very low levels is based on some spread pixels far from each other since the spread error is too small to have rapid effect. Finally the effect is more a noise on a low level than a real visible level.

On the one hand, there is a multi-mask cell-based matrix dithering able to render 3 bits of fractional part in a quite invisible way, on the other hand up to 10 bits are mandatory to have a greyscale quality similar to CRT standards. Moreover, the error diffusion alone is able to render more levels but in such a noisy way that the final picture quality is not enhanced as it could be: the results will be only good at a very long viewing distance that is not the main application for very large screens today.

A combination of error diffusion and multi-mask dithering might help to render more bits of fractional part if one can keep the major advantages of both concepts: quite invisible dithering pattern with more bits (8 bits will be studied as example in the following parts of this document).

A simple possibility for combining these algorithms is shown in FIG. 3

The general representation "8.8 bits" means 8-bit integer and 8-bit fractional part. Since the 8 bits of the fractional part shall be handled differently, they will be decomposed in the 3 MSBs followed by 5 LSBs described as "3.5". Finally, the 16-bits of information are described under the form 8.3.5 bits.

In the case of FIG. 3, the 8 bits of video information are forwarded to a degamma block 1. This block 1 will perform the quadratic degamma function with 16 bits resolution in order to deliver 8.3.5 bits of information. The 5 lowest bits will be diffused in block 2 following a standard error diffusion principle as explained before. Therefore, after this block 2, there are only 8.3 bits of information (5 LSBs being diffused before, symbolized by adder 3). The 3 bits of the fractional part are used to select the appropriate mask 4 from the multi-mask dithering function 4, 5, which will be applied to the picture depending on the frame number, pixel position and colour (R, G or B). At this position, the output value of the mask is either 000 (corresponding to value "0") or 111 (corresponding to value "1") that is added to the current 8.3 bit value. After that a simple truncation 6 will deliver a standard 8-bit integer to the display 7.

The concept described here is simple and obvious. However, it does not work properly. Indeed, in this concept both error diffusion and dithering are applied independently one after the other. This lies in some kind of interferences on the screen in the form of vertical or diagonal periodical structures. These periodical structures are quite annoying and disable a great part of the dithering function so that finally, the rendition of the fractional part does not achieve the 8 target bits.

SUMMARY OF THE INVENTION

In view of that it is the object of the present invention to provide a method and a device for processing video data which guarantee a better picture quality.

According to the present invention this object is solved by a method for processing video data for display on a display device having a plurality of luminous elements corresponding to the pixels of a picture, wherein the time of a video frame or field is divided into a plurality of sub-fields during which the luminous elements can be activated for light emission in small pulses corresponding to a sub-field code word of n bits used for encoding the p possible video levels lighting a pixel, comprising the steps of: performing cell-based, pixel-based or multi-mask dithering for reducing a quantization error, said dithering outputting a dither value "1" or "0" for each pixel or cell, a cell being a luminous element of a pixel, and performing an error diffusion for each pixel or cell for reducing the quantization error, wherein the error diffusion for a pixel or cell, during error diffusion, is added to the value of said pixel or cell if the dither value is equal to "1".

Furthermore, there is provided a device for processing video data for display on a display device having a plurality of luminous elements corresponding to the pixels of a picture, wherein the time of a video frame or field is divided into a plurality of sub-fields during which the luminous elements can be activated for light emission in small pulses corresponding to a sub-field code word of n bits used for encoding the p possible video levels lighting a pixel, comprising: dithering means for performing cell-based, pixel-based or multi-mask dithering in order to reduce a quantization error, said dithering outputting a dither value "1" or "0" for each pixel or cell, a cell being a luminous element of a pixel, and diffusion means for performing error diffusion also in order to reduce the quantization error, wherein an output signal of said dithering means is fed to said diffusion means so that the error diffusion for a pixel or cell is added to the value of said pixel or cell if the dither value is equal to "1".

Advantageously, the error diffusion is applied under the control of the cell-based pixel-based or multi-mask dithering. Thus, a annoying artefacts can be avoided.

The error diffusion for a pixel or a cell is performed if the value of dithering is "1". Since the values of dithering usually are"0" or "1" these values can also be used as switching bits.

The code words should be processed with more than n bits, so that fractional parts of code words can be formed, and the error diffusion is applicable on all bits of a fractional part. However, best results are obtained, if the result of a cell-based, pixel-based or multi-mask dithering is used as switching parameter for switching on and off the error diffusion.

Particularly, the highest bit or a couple of the highest bits of a fractional part may be used for determining the value of the cell-based, pixel-based or multi-mask dithering. Thus, only larger quantization errors initiate an error diffusion, whereas the error diffusion for smaller quantization errors may be accumulated for one cell or one pixel. Thus, error diffusion can be performed depending on the content of the picture. If an error is not diffused it may be stored for a future pixel.

The error to be added to a pixel or a cell by error diffusion may be limited to a maximum error. Preferably, such maximum error is 1. This limitation guarantees that the error does not increase unduly.

BRIEF DESCRIPTION OF THE DRAWINGS

The present invention will now be described in more detail along with the following drawings, showing in.

DESCRIPTION OF PREFERRED EMBODIMENTS

Figure 1:
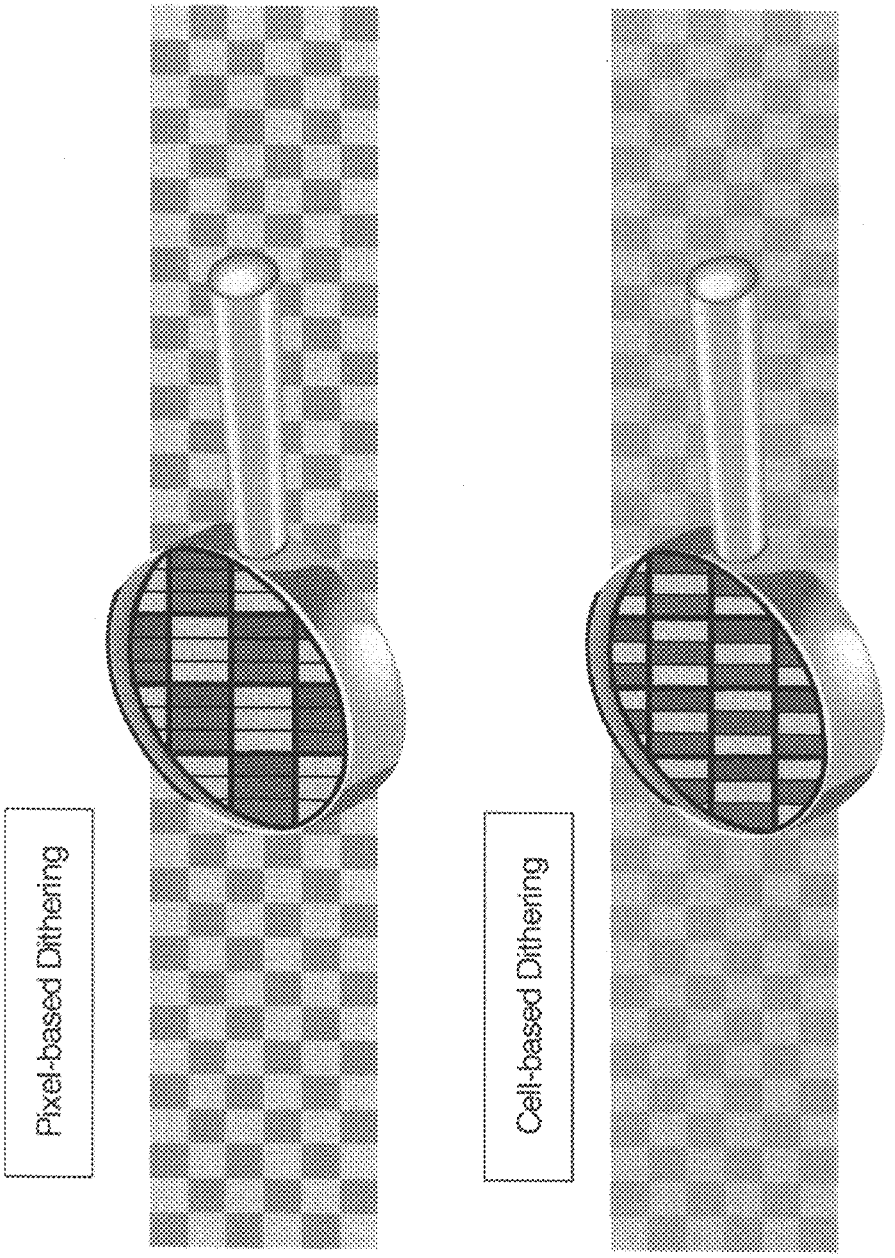
FIG. 1 the principle of pixel-based and cell-based dithering.
Figure 2:
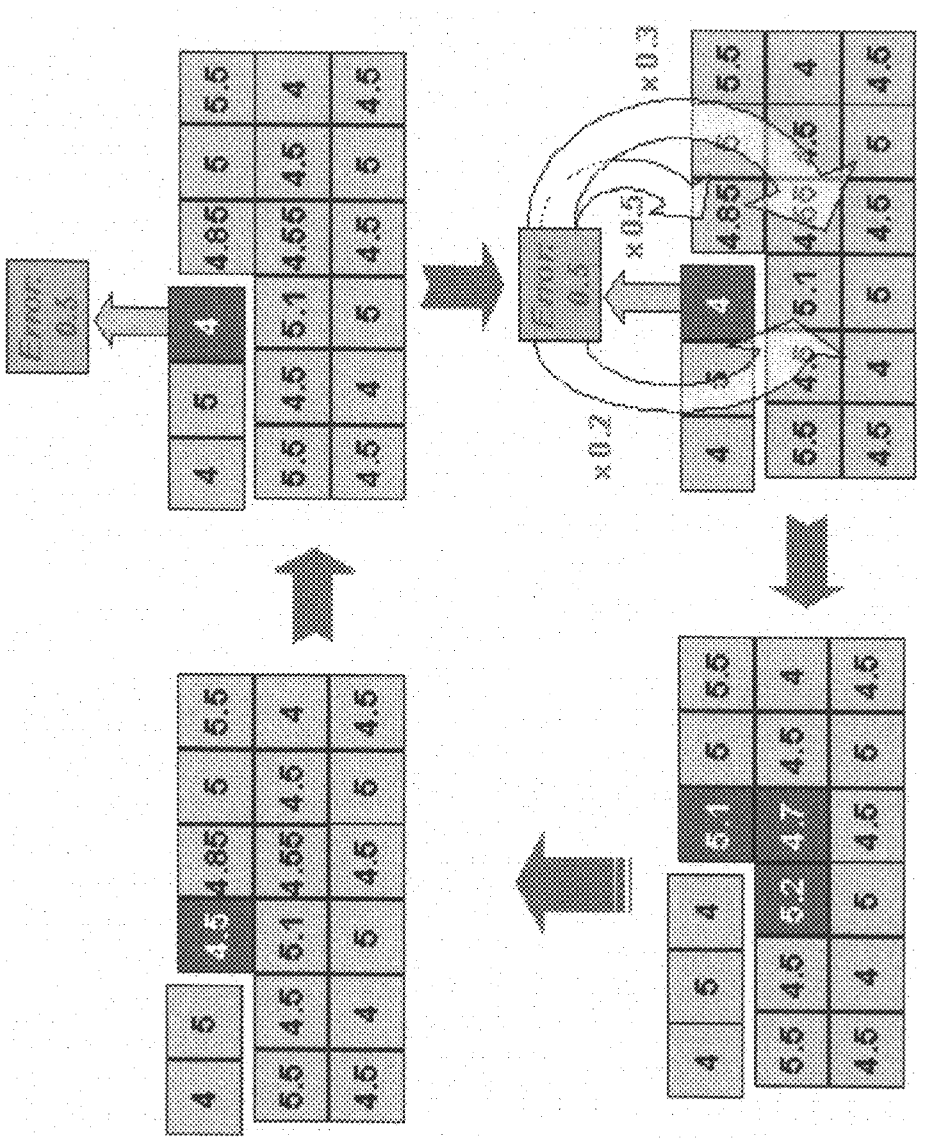
FIG. 2 the principle of error diffusion.
Figure 3:
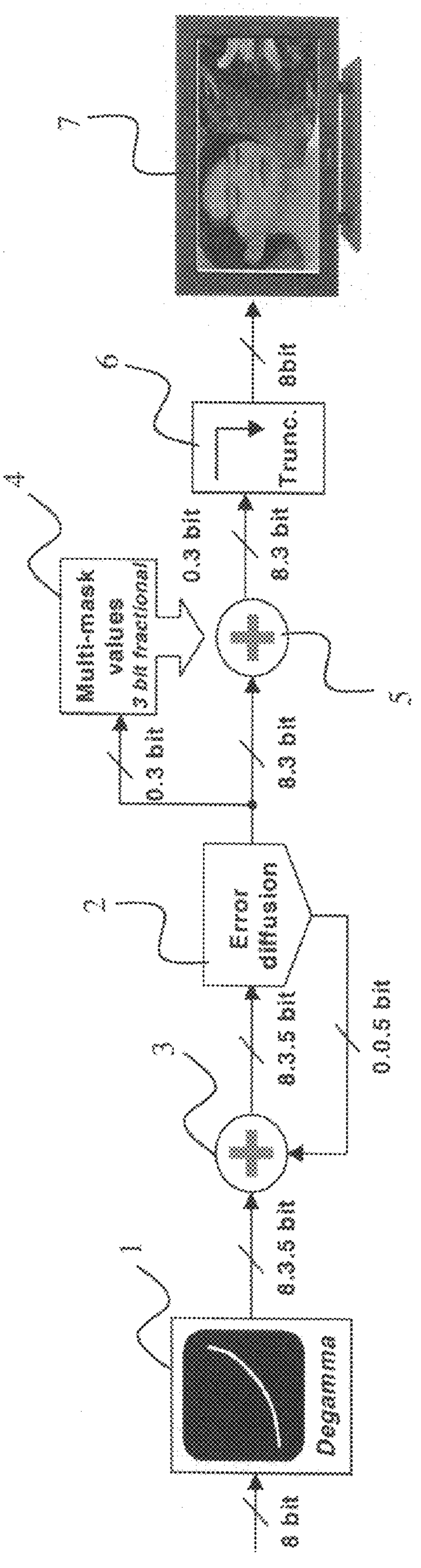
FIG. 3 a block diagram of the combination of multi-mask dithering and error diffusion.
Figure 4:
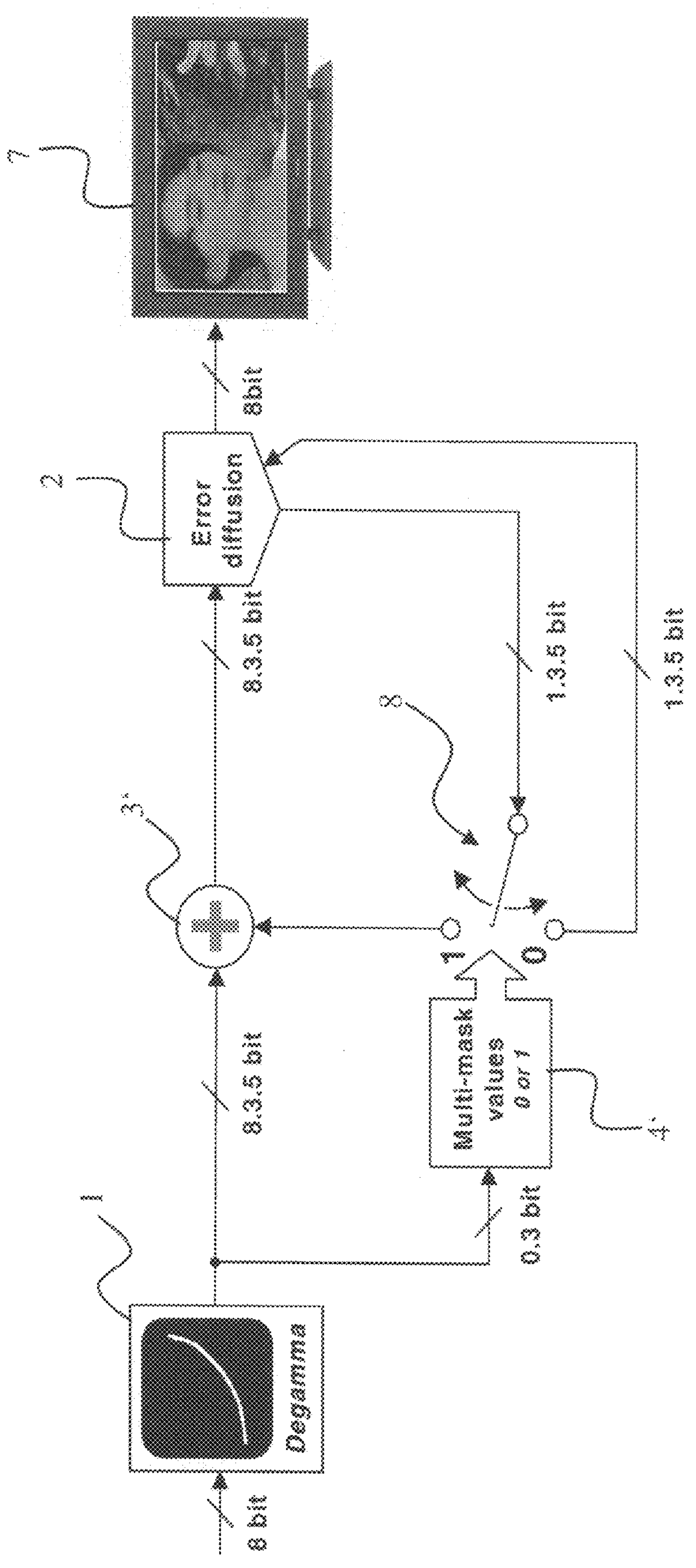
FIG. 4 a block diagram of an improved combination of multi-mask dithering and error diffusion according to a first embodiment of the present invention.

The main issue of combining the error diffusion with the multi-mask/cell-based dithering should be to achieve a rendition of more bits of fractional part while keeping the advantage of a structure of dithering similar to the multimask. According to the present invention this is achieved by a diffusion of all 8 bits of fractional part but the error will only be applied on cells having their multi-mask value at 1. In order to determine the value of the multi-mask, the three highest bits of the fractional part will be chosen. This concept is illustrated in FIG. 4.

The input 8 bits of video information are forwarded to the degamma block 1. This block 1 will perform the quadratic function with 16 bits resolution in order to deliver 8.3.5 bits of information. The complete information is input into an error diffusion block 2 thereby passing an adder 3'. The 3 MSBs of the fractional part of the output from the degamma block 1 are used to define the output of the multi-mask dithering 4', this being 1 or 0. A swith 8 is controlled by the output of the multi-mask block 4'. In case of 1, the error diffused to this pixel is accepted and added by adder 3' to the pixel before going to the error diffusion block 2. If the output of the multi-mask 4' is 0, the diffused error is refused, and will be re-injected via switch 8 inside the error diffusion block 2. The resulting diffused error $x_e'$ and the fractional part $y_e'$ are:

$$x_e'[n] = \begin{cases} x_e[n] \text{ if multi-mask value} = 1 \\ 0.0 \text{ else} \end{cases}$$

and $$y_e'[n] = y_e[n] + \begin{cases} 0 \text{ if multi-mask value} = 1 \\ x_e[n] \text{ else} \end{cases}$$

The error diffusion will only be applied in a multi-mask matrix manner keeping all advantages of this concept. On the other hand, the value applied in a multi-mask manner, is 8-bit fractional and follows the error diffusion principle. As illustrated in FIG. 4 the error diffused can be up to 1.8 bits since the error can be accumulated on a higher number of iterations (if often rejected).

If we use the masks defined by the table given in the preamble of the present specification, a circular permutation should be done in order to add the error at the right place:

Input between x.000 and x.125→mask 1 (mask corresponding to level 1/8 in the table of the preamble)

Input between x.125 and x.250→mask 2 (mask corresponding to level 1/4 in the table of the preamble)

Input between x.250 and x.375→mask 3 (mask corresponding to level 3/8 in the table of the preamble)

Input between x.375 and x.500→mask 4 (mask corresponding to level 1/2 in the table of the preamble)

Input between x.500 and x.625→mask 5 (mask corresponding to level 5/8 in the table of the preamble)

Input between x.625 and x.750→mask 6 (mask corresponding to level 3/4 in the table of the preamble)

Input between x.750 and x.875→mask 7 (mask corresponding to level 7/8 in the table of the preamble)

Input between x.875 and 1→mask 8 (mask full of 1)

Figure 5:
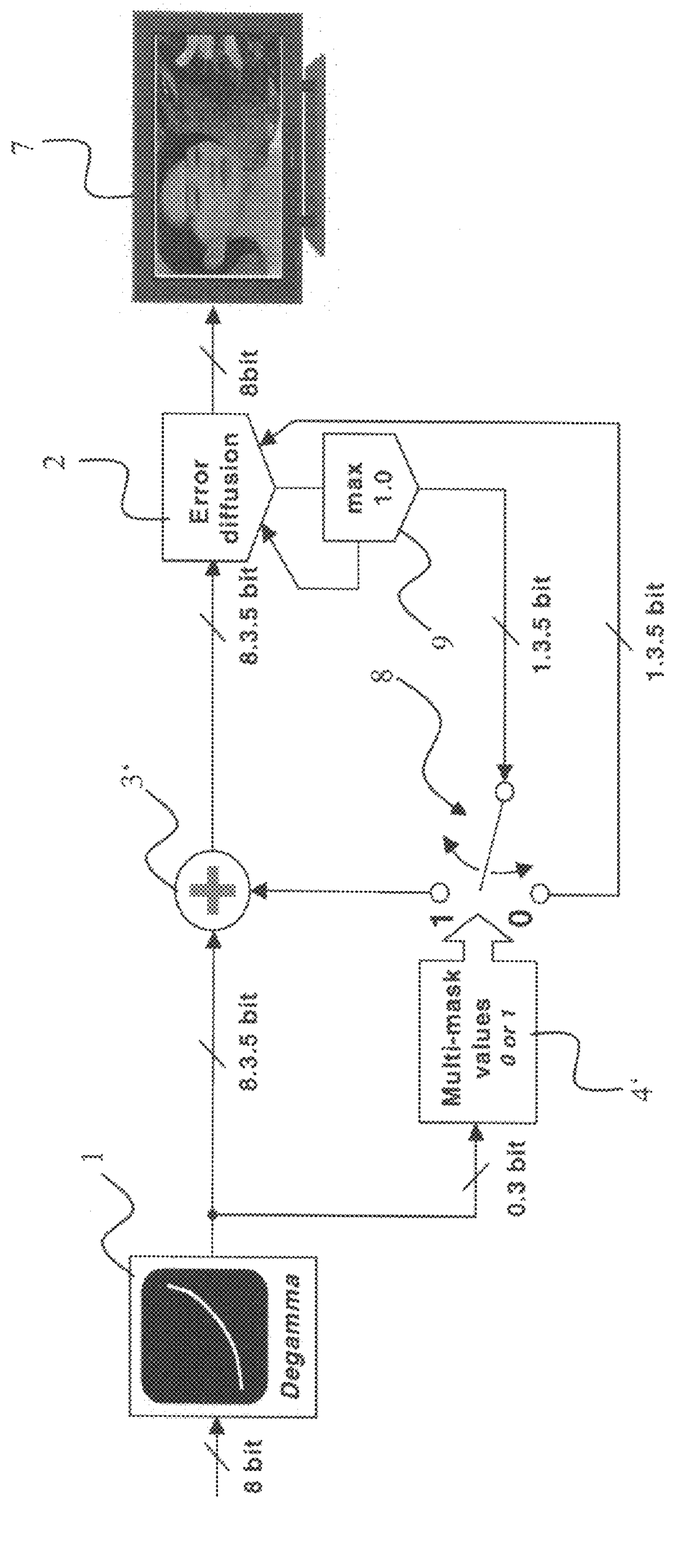
FIG. 5 a block diagram of a second embodiment of the present invention

An improved embodiment of the invention is shown in FIG. 5. Since the error diffused to one pixel can be, depending on the multi-mask value, re-injected inside the error diffusion block 2, it is easy to understand that the error can increase a lot. Therefore, an improvement of the concept will be to limit the error that can be added to the current pixel to a maximum by a limiter 9. The rest being re-injected again inside the error diffusion block as shown in FIG. 5.

The updated concept is similar to the previous one, excepted the fact that the error added to the pixel is limited to 1.0, the rest being re-injected again in the error diffusion block 2 as described below:

$$x_e''[n] = \begin{cases} x_e'[n] \text{ if } x_e'[n] \le 1.0 \\ 1.0 \text{ else} \end{cases} \quad \text{and}$$

$$y_e''[n] = y_e'[n] + \begin{cases} 0 \text{ if } x_e'[n] \le 1.0 \\ x_e'[n] - 1.0 \text{ else} \end{cases}$$

The above described embodiments are directed to a PDP. However, any other kind of digital display may profit from the present invention.

The invention claimed is:

1. Method for processing a video data signal to be displayed on a display device having a plurality of luminous elements corresponding to pixels of a picture, wherein a duration of a video frame or field is divided into a plurality of sub-fields during which the luminous elements can be activated for light emission in small pulses corresponding to a sub-field code word of n bits used for encoding p possible video levels lighting a pixel, comprising the steps of:

performing cell-based, pixel-based or multi-mask dithering for reducing a quantization error, said dithering outputting a dither value "1" or "0" for each pixel or cell, a cell being a luminous element of a pixel, and performing an error diffusion for each pixel or cell in a diffusion means for reducing the quantization error, wherein the error diffusion for a pixel or cell, during error diffusion, is added to a value of said pixel or cell if the dither value of said pixel or cell is equal to "1" and is not added and re-injected into the diffusion means if the dither value is equal to "0" for avoiding artifacts in the displayed video data on the display device, and wherein the code words are processed with more than n bits, so that values lying between the values of rendered code words can be formed, and the error diffusion is applied on all bits of each of these values.

2. Method according to claim 1, wherein the highest bit or a couple of the highest bits of a fractional part is/are used for determining the value of said dithering.

3. Method according to claim 1, wherein a diffused error is accumulated for one cell or pixel by said re-injection.

4. Method according to claim 1, wherein the error to be added to a pixel or cell by error diffusion is limited to a maximum error.

5. Method according to claim 4, wherein the maximum error is 1.

6. Device for processing a video data signal to be displayed on a display device having a plurality of luminous elements corresponding to pixels of a picture, wherein a duration of a video frame or field is divided into a plurality of sub-fields during which the luminous elements can be activated for light emission in small pulses corresponding to a sub-field code word of n bits used for encoding p possible video levels lighting a pixel, comprising:

dithering means for performing cell-based, pixel-based or multi-mask dithering in order to reduce a quantization error, said dithering outputting a dither value "1" or "0" for each pixel or cell, a cell being a luminous element of a pixel, and diffusion means for performing error diffusion also in order to reduce the quantization error, wherein an output signal of said dithering means is fed to said diffusion means so that the error diffusion for a pixel or cell is added to a value of said pixel or cell if the dither value of said pixel or cell is equal to "1" and is not added and re-injected into the diffusion means if the dither value is equal to "0" for avoiding artifacts in the displayed video data on the display device, and wherein the code words are processed with more than n bits, so that values lying between the values of rendered code words can be formed, and the error diffusion is applied on all bits of each of these values.

7. Device according to claim 6, wherein said diffusion means comprises means to accumulate a diffused error for one cell or pixel.

* * * * *